US009917451B2

(12) United States Patent
Kim

(10) Patent No.: US 9,917,451 B2
(45) Date of Patent: Mar. 13, 2018

(54) BATTERY PACK AND CONTROLLING METHOD THEREOF

(71) Applicant: Samsung SDI Co., Ltd., Yongin-si, Gyeonggi-do (KR)

(72) Inventor: Tae-Jin Kim, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 350 days.

(21) Appl. No.: 14/642,470

(22) Filed: Mar. 9, 2015

(65) Prior Publication Data

US 2015/0263559 A1 Sep. 17, 2015

(30) Foreign Application Priority Data

Mar. 12, 2014 (KR) ........................ 10-2014-0029086

(51) Int. Cl.
*H02J 7/00* (2006.01)
(52) U.S. Cl.
CPC .................................. *H02J 7/0031* (2013.01)
(58) Field of Classification Search
CPC ...................................................... Y02E 60/12
USPC ........................................................ 320/103
See application file for complete search history.

(56) References Cited

U.S. PATENT DOCUMENTS

| | | | | |
|---|---|---|---|---|
| 5,471,128 A | * | 11/1995 | Patino | H01M 10/44 320/128 |
| 6,037,750 A | * | 3/2000 | Von Novak | H02J 7/0011 320/128 |
| 6,812,673 B2 | * | 11/2004 | Fujiwara | H02J 7/0031 320/136 |
| 7,531,988 B2 | * | 5/2009 | Sato | H02J 7/0031 320/134 |
| 7,619,392 B2 | * | 11/2009 | Wang | G01R 31/3624 320/134 |
| 8,179,097 B2 | * | 5/2012 | Yun | H02J 7/0031 320/134 |
| 2002/0180412 A1 | | 12/2002 | Yi | |

(Continued)

FOREIGN PATENT DOCUMENTS

| KR | 10-2001-0054188 A | 7/2001 |
|---|---|---|
| KR | 10-2003-0020948 A | 3/2003 |

(Continued)

*Primary Examiner* — Yalkew Fantu
(74) *Attorney, Agent, or Firm* — Knobbe Martens Olson & Bear LLP

(57) ABSTRACT

A battery pack and a controlling method thereof are disclosed. In one aspect, the battery pack includes a charge/discharge control switch connected between the battery cell and a terminal of the battery pack and configured to control charge and discharge current of the battery cell. The battery pack also includes a battery management system configured to generate an operating signal to control the charge/discharge control switch, wherein the operating signal comprises a first operating signal having a varying level or a second operating signal having a constant level. The battery pack further includes a monitoring unit configured to control an on/off state of the charge/discharge control switch based at least in part the operating signal received from the battery management system, and a blocking unit configured to turn off the charge/discharge control switch based at least in part a blocking signal received from the battery management system.

21 Claims, 5 Drawing Sheets

(56) References Cited

U.S. PATENT DOCUMENTS

2010/0129700 A1* 5/2010 Tanno ................. H01M 10/441
429/93
2013/0148246 A1 6/2013 Jung et al.

FOREIGN PATENT DOCUMENTS

| KR | 10-2013-0048869 A | 5/2011 |
| KR | 10-2013-0066462 A | 6/2013 |

* cited by examiner

BATTERY PACK AND CONTROLLING METHOD THEREOF

CROSS-REFERENCE TO RELATED APPLICATIONS

This application claims priority to and the benefit of Korean Patent Application No. 10-2014-0029086, filed on Mar. 12, 2014, in the Korean Intellectual Property Office, the entire contents of which are incorporated herein by reference in their entirety.

BACKGROUND

Field

The described technology generally relates to a battery pack and a controlling method thereof.

Description of the Related Technology

As portable electronic devices such as mobile phones, digital cameras, and laptops are in wide use, a demand exists from more efficient rechargeable batteries. Furthermore, research has been directed to a large capacity battery system for an electric vehicle, an uninterruptible power supply (UPS) or an energy storage system.

The standard commercial battery is configured as a battery pack of battery cells together with a protection circuit configured to control the charging and discharging of the battery. The protection circuit should efficiently and safely charge or discharge the battery.

SUMMARY OF CERTAIN INVENTIVE ASPECTS

One inventive aspect is a battery pack and a controlling method thereof, capable of controlling a battery even when the battery pack is operating abnormally.

Another aspect is a battery pack having at least one battery cell, the battery pack including a charge/discharge control switch connected between the battery cell and a terminal of the battery pack; a battery management system configured to control the charge/discharge control switch; a monitoring unit configured to control an on/off state of the charge/discharge control switch, in response to an operating signal of the battery management system; and a blocking unit configured to turn off the charge/discharge control switch in response to a blocking signal of the battery management system, wherein the operating signal comprises a first operating signal having a varying level or a second operating signal having a constant level.

The monitoring unit may perform control such that the charge/discharge control switch is on when the first operating signal is input, and the charge/discharge control switch is off when the second operating signal is input.

If the blocking unit receives the blocking signal while the charge/discharge control switch is controlled to be on by the monitoring unit, the blocking unit may turn off the charge/discharge control switch.

The monitoring unit may further include a vibrator circuit, the vibrator circuit outputting a first level signal when the first operating signal is input, and outputting a second level signal when the second operating signal is input.

The charge/discharge control switch may include a discharge control switch including a first parasitic diode and a first transistor; and a charge control switch including a second parasitic diode and a second transistor.

The monitoring unit may include a first monitoring unit controlling an on/off state of the discharge control switch, and including a first vibrator circuit; and a second monitoring unit controlling an on/off state of the charge control switch, and including a second vibrator circuit.

The first monitoring unit may further include a third transistor connected between a control electrode of the first transistor and a ground; a first resistor connected between a control electrode of the first transistor and the third transistor; and a second resistor connected between the control electrode of the first transistor and the first electrode of the first transistor.

When the first level signal is input from the first vibrator circuit into the control electrode of the third transistor, the third transistor may be controlled to be on.

The second monitoring unit may further include a fourth transistor connected between a control electrode of the second transistor and the ground; a third resistor connected between the control electrode of the second transistor and the fourth transistor; and a fourth resistor connected between the control electrode of the second transistor and the first electrode of the second transistor.

When the first level signal is input from the second vibrator circuit into the control electrode of the fourth transistor, the fourth transistor may be controlled to be on.

The blocking unit may include a first blocking unit configured to turn off the discharge control switch; and a second blocking unit configured to turn off the charge control switch.

The first blocking unit may include a fifth transistor connected between the control electrode of the first transistor and the first electrode of the first transistor; a sixth transistor connected between a control electrode of the fifth transistor and the ground; a fifth resistor connected between the control electrode of the fifth transistor and the first electrode of the first transistor; and a sixth resistor connected between the control electrode of the fifth transistor and the sixth transistor.

When the blocking signal is input into the control electrode of the sixth transistor, each of the fifth and sixth transistors may be controlled to be on.

The second blocking unit may include a seventh transistor connected between the control electrode of the second transistor and the first electrode of the second transistor; an eighth transistor connected between a control electrode of the seventh transistor and the ground; a seventh resistor connected between the control electrode of the seventh transistor and the first electrode of the second transistor; and an eighth resistor connected between the control electrode of the seventh transistor and the eighth transistor.

When the blocking signal is input into the control electrode of the eighth transistor, each of the seventh and eighth transistors may be controlled to be on.

When a terminal of the battery cell is connected to the first electrode of the first transistor, a terminal of the battery pack may be connected to the first electrode of the second transistor, and when the terminal of the battery pack is connected to the first electrode of the first transistor, the terminal of the battery cell may be connected to the first electrode of the second transistor.

Another aspect is a method of controlling a battery pack having at least one battery cell, and a battery management system configured to control a charge/discharge control switch connected between the battery cell and a terminal of the battery pack, the method including monitoring an operating state of the battery management system using an operating signal of the battery management system; controlling an on/off state of the charge/discharge control switch according to a monitored result; and turning off the charge/ discharge control switch if a blocking signal is received from the battery management system while the charge/discharge control switch is controlled to be on, wherein the operating signal comprises a first operating signal having a varying level or a second operating signal having a constant level.

Another aspect is a battery pack including at least one battery cell, the battery pack comprising: a charge/discharge control switch connected between the battery cell and a terminal of the battery pack and configured to control charge and discharge current of the battery cell; a battery management system configured to generate an operating signal to control the charge/discharge control switch, wherein the operating signal comprises a first operating signal having a varying level or a second operating signal having a constant level; a monitoring unit configured to control an on/off state of the charge/discharge control switch based at least in part the operating signal received from the battery management system; and a blocking unit configured to turn off the charge/discharge control switch based at least in part a blocking signal received from the battery management system.

In the above battery pack, the monitoring unit is further configured to control the charge/discharge control switch to remain turned on based at least in part on the first operating signal, and turn off the charge/discharge control switch based at least in part on the second operating signal. In the above battery pack, the blocking unit is further configured to turn off the charge/discharge control switch based at least in part on the blocking signal received while the charge/discharge control switch is turned on. In the above battery pack, the monitoring unit further comprises a vibrator circuit configured to output a first level signal based at least in part on the first operating signal, and output a second level signal based at least in part on the second operating signal. In the above battery pack, the charge/discharge control switch comprises: a discharge control switch including a first parasitic diode and a first transistor; and a charge control switch including a second parasitic diode and a second transistor. In the above battery pack, the monitoring unit comprises: a first monitoring unit including a first vibrator circuit and configured to control an on/off state of the discharge control switch; and a second monitoring unit including a second vibrator circuit and configured to control an on/off state of the charge control switch. In the above battery pack, the first monitoring unit further comprises: a third transistor connected between a control electrode of the first transistor and a ground; a first resistor connected between a control electrode of the first transistor and the third transistor; and a second resistor connected between the control electrode of the first transistor and a first electrode of the first transistor.

In the above battery pack, the third transistor is configured to be turned on when the first level signal is provided from the first vibrator circuit into the control electrode of the third transistor. In the above battery pack, the second monitoring unit further comprises: a fourth transistor connected between a control electrode of the second transistor and the ground; a third resistor connected between the control electrode of the second transistor and the fourth transistor; and a fourth resistor connected between the control electrode of the second transistor and a first electrode of the second transistor. In the above battery pack, the fourth transistor is configured to be turned on when the first level signal is provided from the second vibrator circuit into the control electrode of the fourth transistor. In the above battery pack, the blocking unit comprises: a first blocking unit configured to turn off the discharge control switch; and a second blocking unit configured to turn off the charge control switch. In the above battery pack, the first blocking unit comprises: a fifth transistor connected between the first and control electrodes of the first transistor; a sixth transistor connected between a control electrode of the fifth transistor and the ground; a fifth resistor connected between the control electrode of the fifth transistor and the first electrode of the first transistor; and a sixth resistor connected between the control electrode of the fifth transistor and the sixth transistor. In the above battery pack, each of the fifth and sixth transistors is configured to be turned on when the blocking signal is input into the control electrode of the sixth transistor.

In the above battery pack, the second blocking unit comprises: a seventh transistor connected between the first and control electrodes of the second transistor; an eighth transistor connected between a control electrode of the seventh transistor and the ground; a seventh resistor connected between the control electrode of the seventh transistor and the first electrode of the second transistor; and an eighth resistor connected between the control electrode of the seventh transistor and the eighth transistor. In the above battery pack, each of the seventh and eighth transistors is configured to be turned on when the blocking signal is input into the control electrode of the eighth transistor. In the above battery pack, a terminal of the battery pack is configured to be connected to the first electrode of the second transistor when a terminal of the battery cell is connected to the first electrode of the first transistor, and wherein the terminal of the battery cell is configured to be connected to the first electrode of the second transistor when the terminal of the battery pack is connected to the first electrode of the first transistor.

Another aspect is a method of controlling a battery pack including at least one battery cell, and a battery management system configured to control a charge/discharge control switch connected between the battery cell and a terminal of the battery pack, the method comprising: monitoring an operating state of the battery management system based at least in part on an operating signal received from the battery management system; controlling an on/off state of the charge/discharge control switch based at least in part on a monitored result; and turning off the charge/discharge control switch when a blocking signal is received from the battery management system while the charge/discharge control switch is turned on, wherein the operating signal comprises a first operating signal having a varying level or a second operating signal having a constant level.

In the above method, the monitoring further comprises: determining that the battery management system is operating normally when the battery management system outputs the first operating signal; and determining that the battery management system is operating abnormally when the battery management system outputs the second operating signal. In the above method, the controlling further comprises: determining that the battery management system is operating normally when the charge/discharge control switch is turned on; and determining that the battery management system is operating abnormally when the charge/discharge control switch is turned off.

Another aspect is a battery pack including at least one battery cell, the battery pack comprising: a charge/discharge control switch connected between the battery cell and a terminal of the battery pack and configured to control charge and discharge current of the battery cell; a battery management system configured to generate an operating signal to control the charge/discharge control switch, wherein the operating signal comprises a first operating signal having a varying level or a second operating signal having a constant level; and a monitoring unit configured to determine, based at least in part on the first operating signal, that the battery management system is operating normally and to control the charge/discharge control switch to remain turned on, and wherein the monitoring unit is further configured to determine, based at least in part on the second operating signal, that the battery management system is operating abnormally and turn off the charge/discharge control switch.

According to at least one of the disclosed embodiments, it is possible to reliably protect a battery even when a battery management system included in a battery pack to control the charging/discharging of the battery is operating abnormally.

DETAILED DESCRIPTION OF CERTAIN INVENTIVE EMBODIMENTS

Figure 1:
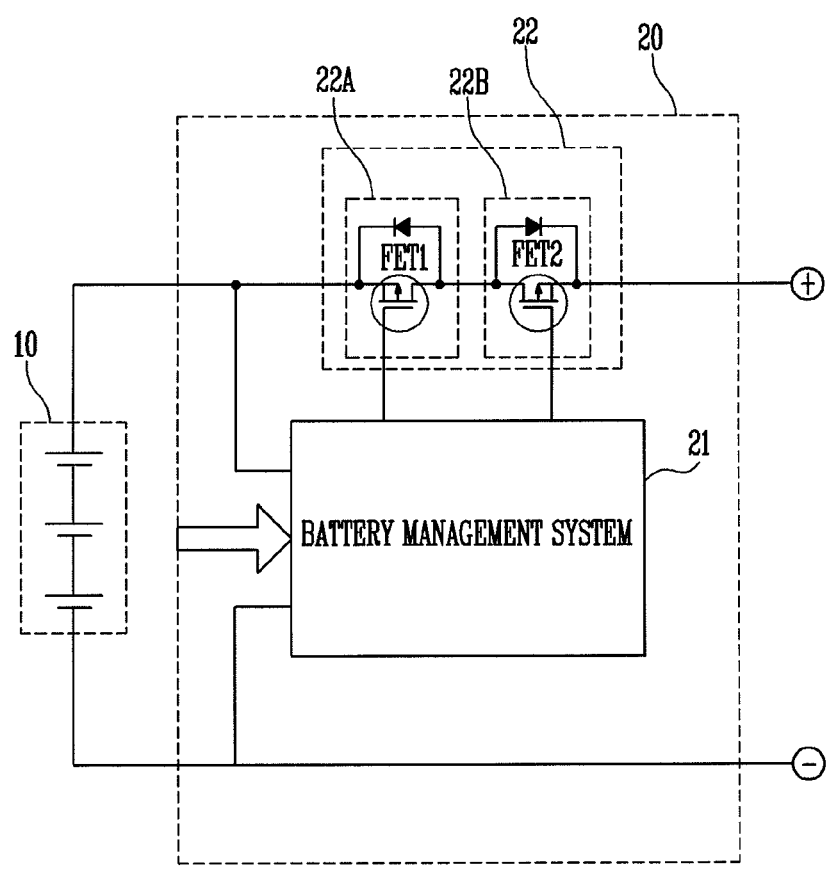
FIG. 1 is a view showing an example of a typical battery pack.

FIG. 1 is a view showing an example of a typical battery pack (not necessarily prior art). Referring to FIG. 1, the battery pack 1 includes a battery 10 and a protection circuit 20. The protection circuit 20 includes a battery management system 21 configured to control the charging and discharging of the battery, and a charge/discharge control switch 22.

When a defect occurs in the battery pack 1 during a discharging operation, the battery management system 21 turns off a discharge control switch 22A, thus protecting the battery 10. Furthermore, when a defect occurs in the battery pack 1 during a charging operation, the battery management system 21 turns off a charge control switch 220B, thus protecting the battery 100. However, if the battery management system 21 is operating abnormally, it is very difficult to control the charge/discharge control switch 22 and thereby protect the battery 10.

In the following detailed description, only certain exemplary embodiments have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

In this disclosure, the term "substantially" includes the meanings of completely, almost completely or to any significant degree under some applications and in accordance with those skilled in the art. Moreover, "formed on" can also mean "formed over." The term "connected" includes an electrical connection.

Hereinafter, embodiments will be described with reference to the accompanying drawings.

Figure 2:
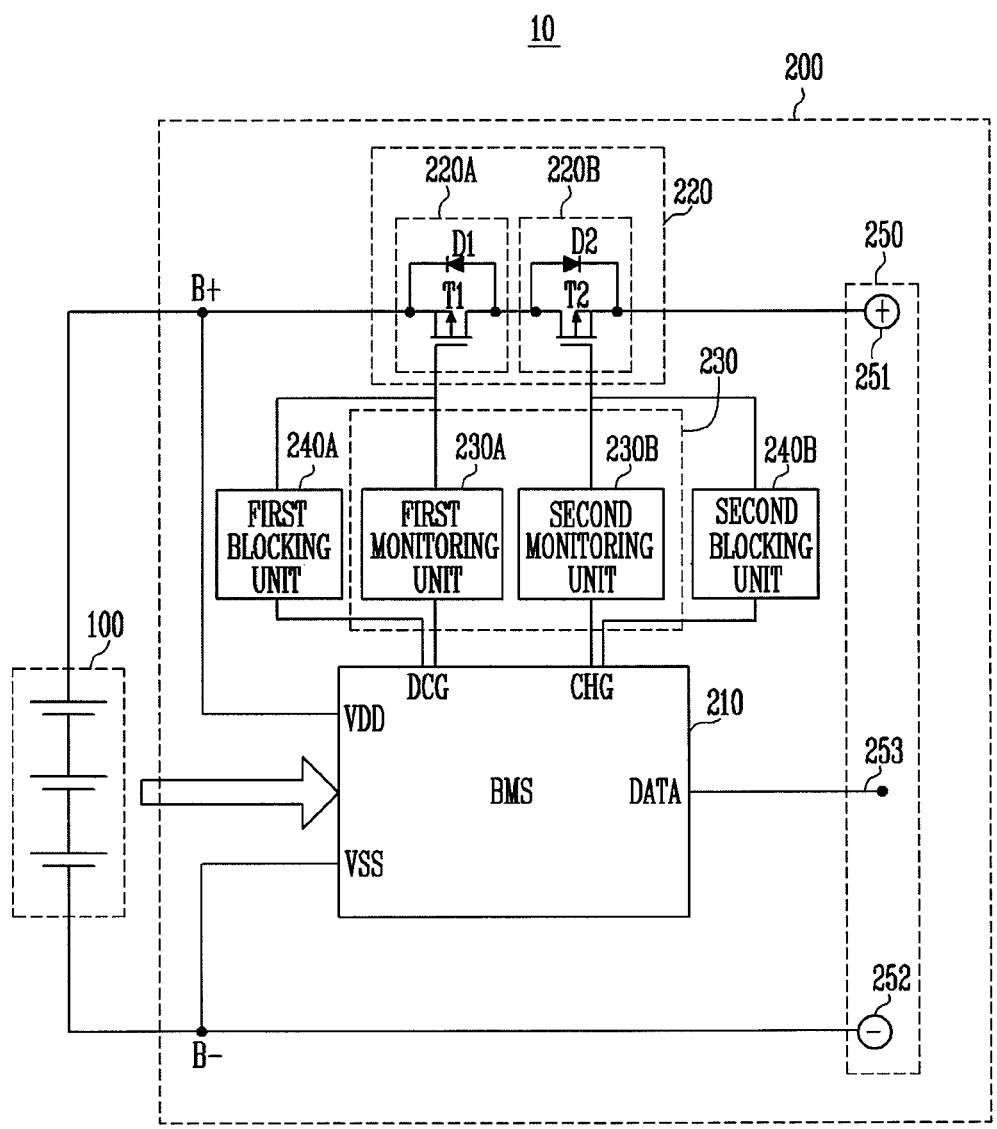
FIG. 2 is a circuit diagram of a battery pack according to an embodiment.

FIG. 2 is a circuit diagram of a battery pack according to an embodiment of the present invention.

Referring to FIG. 2, the battery pack 10 includes a battery 100 and a protection circuit 200. The protection circuit 200 includes a battery management system (hereinafter referred to as 'BMS') 210, a charge/discharge control switch 220, a monitoring unit 230, a blocking unit including first and second blocking units 240A and 240B, and a terminal unit 250. The charge/discharge control switch 220 includes a discharge control switch 220A and a charge control switch 220B.

The battery 100 stores power, and supplies power to an electronic device to which the battery pack 10 is mounted. Further, if a charger is connected to the battery pack 10, the battery 100 may be charged using external power. The battery 100 may include at least one battery cell. Various secondary (rechargeable) batteries may be used for the battery cell. For example, the secondary battery used for the battery cell may include one or more of the following batteries: a nickel-cadmium battery, a lead storage battery, a nickel metal hydride battery (NiMH), a lithium ion battery, a lithium polymer battery, etc.

The BMS 210 is configured to control the charging/discharging operation of the battery 100 and the entire operation of the protection circuit 200. The BMS 210 may include a power supply terminal VDD, a ground terminal VSS, a current control terminal CC, a discharge control terminal DCG, a charge control terminal CHG, a data terminal DATA and others.

Power supply voltage and ground voltage are applied to the BMS 210 via the power supply terminal VDD and the ground terminal VSS, respectively.

The BMS 210 outputs an operating signal to the monitoring unit 230 to control the on/off state of the charge/discharge control switch 220.

In some embodiments, the BMS 210 outputs an operating signal to the monitoring unit 230 via the discharge control terminal DCG to control the on/off state of the discharge control switch 220A during the discharging operation. Further, the BMS 210 outputs an operating signal through the charge control terminal CHG to control the on/off state of the charge control switch 220B during the charging operation. The BMS 210 outputs data via the data terminal DATA, and the output data is transmitted through a communication terminal 253 to an external device. Further, the BMS 210 may receive data or instructions, applied to the communication terminal 253, via the data terminal DATA.

The BMS 210 monitors a charging or discharging state of the battery 100, a temperature, a current flow state in the battery pack 10, etc. Further, the BMS 210 may measure intermediate voltage between the battery cells. The BMS 210 can control the cell balancing of the battery cell and the charging/discharging of the battery 100 according to the monitored or measured result. Although not shown in FIG. 2, the BMS 210 may further include terminals for measuring the intermediate voltage, the temperature and/or others or for monitoring the charging or discharging state or the current flow.

Although it is shown in the disclosed embodiments that the BMS 210 controls all components in the battery pack 10, the described technology is not limited thereto. For example, the battery pack may be configured such that it further includes an analog front end (not shown) for monitoring the state of the battery 100 and controlling the operation of the charge/discharge control switch 220 and the BMS 210 controls the analog front end.

The discharge control switch 220A and the charge control switch 220B can be located on a high current path to control the flow of discharge current and charge current. The discharge control switch 220A serves to control the flow of the discharge current, while the charge control switch 220B serves to control the flow of the charge current.

The discharge control switch 220A includes a first transistor T1 and a first parasitic diode D1. The first transistor T1 is connected to limit the flow of current from a negative terminal 252 to the battery 100 or from the battery 100 to a positive terminal 251. That is, the use of the first transistor T1 blocks the flow of discharge current. Here, the first transistor T1 is formed to allow charge current to flow through the first parasitic diode D1. A connecting direction of first and second electrodes of the first transistor T1 is opposite to a connecting direction of first and second electrodes of the second transistor T2.

The first electrode may be established as either of a source electrode or a drain electrode, and the second electrode may be established as an electrode different from the first electrode. For example, if the first electrode is established as the source electrode, the second electrode established as the drain electrode.

As shown in FIG. 2, the positive terminal B+ of the battery 100 is connected to the first electrode of the first transistor T1, and the positive terminal 251 of the battery pack 10 is connected to the first electrode of the second transistor T2. Of course, the positive terminal 251 of the battery pack 10 may be connected to the first electrode of the first transistor T1, and the positive terminal B+ of the battery 100 may be connected to the first electrode of the second transistor T2.

The charge control switch 220B includes a second transistor T2 and a second parasitic diode D2. The second transistor T2 is connected to limit the flow of current from the positive terminal 251 to the battery 100 or from the battery 100 to the negative terminal 252. That is, the flow of charge current is blocked using the second transistor T2. In this case, the second transistor T2 is formed to allow discharge current to flow through the second parasitic diode D2.

The monitoring unit 230 can monitor the operating state (normal operation, abnormal operation) of the BMS 210 in response to an operating signal that is output from the BMS 210, and thereby control the on/off state of the charge/discharge control switch 220 according to the monitored operating state.

The operating signal may include a first operating signal having a varying level, and a second operating signal having a constant level.

Figure 3A:
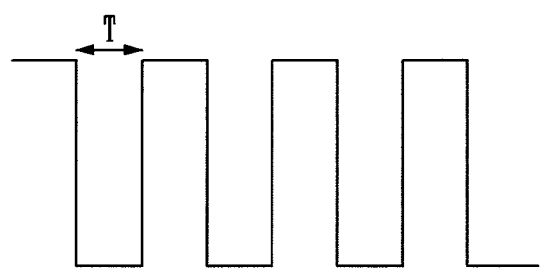
FIGS. 3A and 3B are views showing an operating signal according to an embodiment.

In some embodiments, if the operating signal is the first operating signal whose level varies per a predetermined time T as shown in FIG. 3A, the monitoring unit 230 determines that the BMS 210 is operating normally, and then controls the charge/discharge control switch 220 to be turned on. In some embodiments, if the operating signal is the second operating signal whose level is kept constant beyond a predetermined time T, the monitoring unit 230 determines that the BMS 210 is operating abnormally, and then controls the charge/discharge control switch 220 to be turned off.

Figure 3B:
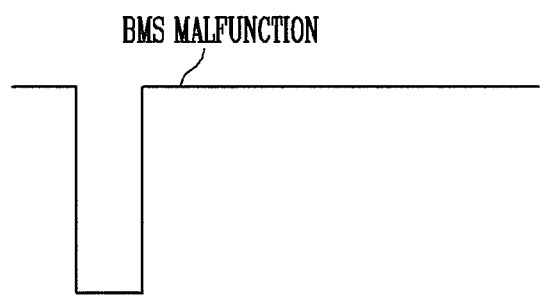

If the BMS 210 is operating normally, it is possible to output the first operating signal, the level of which varies per the predetermined time T. However, if the BMS 210 malfunctions as shown in FIG. 3B, the BMS 210 does not change the level of the operating signal, so that the second operating signal whose level is kept constant is output.

In the case where the BMS 210 directly controls the charge/discharge control switch 220, if the BMS 210 continues outputting only the ON signal of the charge/discharge control switch 220 due to its abnormal operation, it is difficult to protect the battery when it is over-charged or over-discharged.

On the contrary, when the monitoring unit 230 receives the second operating signal having the constant level from the BMS 210, the monitoring unit 230 controls the charge/discharge control switch 220 to be turned off in response to determining that the BMS 210 is operating abnormally, the battery 100 can be protected.

The monitoring unit 230 may include a first monitoring unit 230A and a second monitoring unit 230B. The first monitoring unit 230A receives the operating signal from the discharge control terminal DCG of the BMS 210 during the discharging operation of the battery, and then controls the on/off state of the discharge control switch 220A. The second monitoring unit 230B receives the operating signal from the charge control terminal (CHG) of the BMS 210 during the charging operation of the battery, and then controls the on/off state of the charge control switch 220B.

The first and second blocking units 240A and 240B can turn off the charge/discharge control switch 220 based on the blocking signal that is input from the BMS 210.

For example, the first blocking unit 240A turns off the discharge control switch 220A based on the blocking signal that is input through the discharge control terminal DCG of the BMS 210. Furthermore, the second blocking unit 240B turns off the charge control switch 220B based on the blocking signal that is input through the charge control terminal CHG of the BMS 210.

If a defect occurs in the battery pack 10 during the charging/discharging operation, the BMS 210 may output the second operating signal having the constant level to the monitoring unit 230 and then control the charge/discharge control switch 220 to be turned off.

However, the monitoring unit 230 monitors whether the level of the operating signal is changed per the predetermined time, thus controlling the charge/discharge control switch 220. That is, a delay operation exceeding the predetermined time may occur when the charge/discharge control switch 220 is controlled from the on state to off state.

In some embodiments, the first and second blocking units 240A and 240B are further provided to allow the charge/discharge control switch 220 to be rapidly turned off, thus solving the delay operation due to the monitoring unit 230. That is, if the blocking units 240A and 240B receive the blocking signal from the BMS 210 while the charge/discharge control switch 220 is controlled to be turned on by the monitoring unit 230, the blocking units 240A and 240B turn off the charge/discharge control switch 220.

The terminal unit 250 couples the battery pack 10 with an external device. Here, the external device may be an electronic device, a vehicle, an electric vehicle, a charger, etc. The terminal unit 250 includes a positive terminal 251, a negative terminal 252, a communication terminal 253, etc.

The charge current enters the positive terminal 251, and the discharge current exits the positive terminal 251. On the contrary, the charge current exits the negative terminal 252, and the discharge current enters the negative terminal 252. The communication terminal 253 is connected to the data terminal DATA of the BMS 210, thus serving as a path for transmitting data and an instruction between the BMS 210 and the external device.

Figure 4:
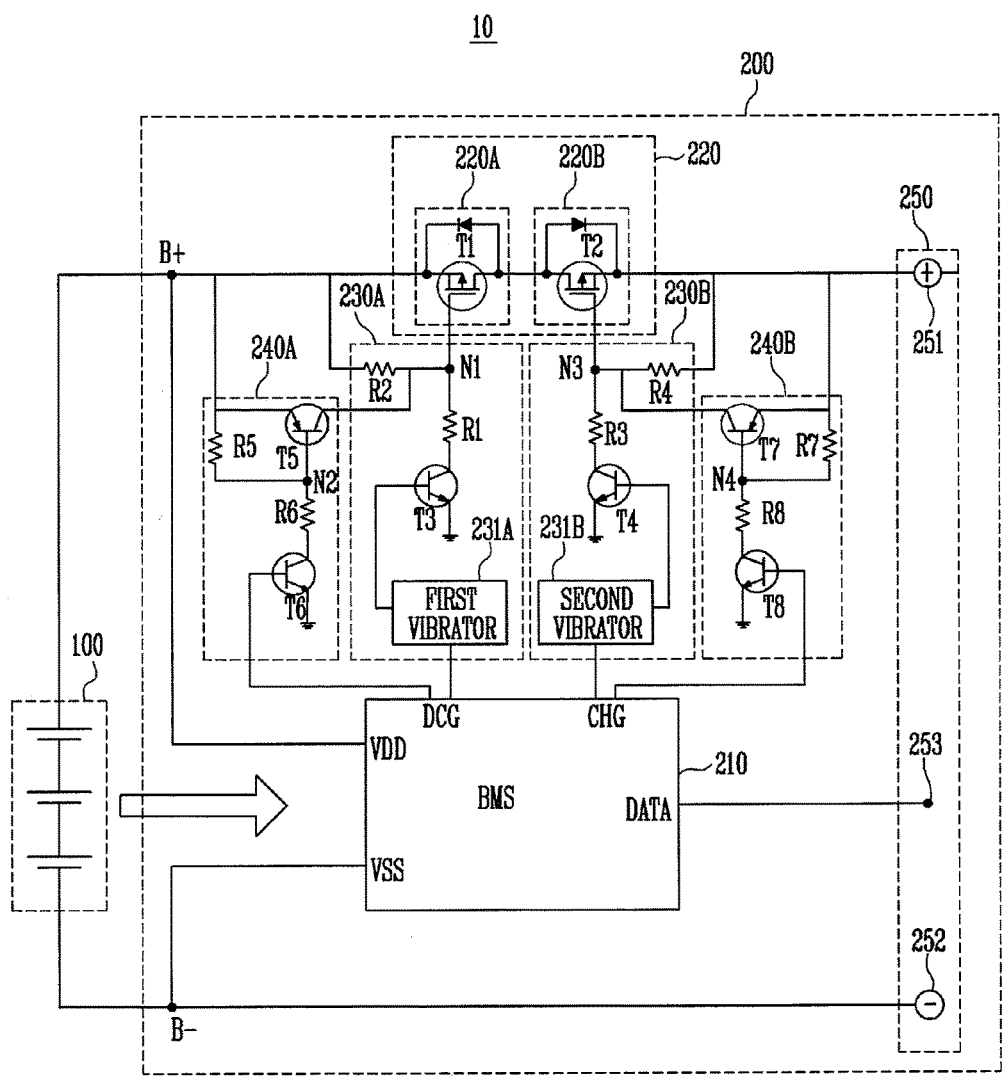
FIG. 4 is a circuit diagram of a battery pack, showing in detail circuits of a monitoring unit and a blocking unit according to an embodiment.

FIG. 4 is a circuit diagram of the battery pack, showing in detail circuits of the monitoring unit and the blocking unit according to an embodiment. The circuit configuration and driving principle of the first monitoring unit 230A, the first blocking unit 240A, the second monitoring unit 230B, and the second blocking unit 240B will be described below in detail with reference to FIG. 4.

The first monitoring unit 230A includes a first vibrator circuit 231A and a third transistor T3.

The first vibrator circuit 231A can receive an operating signal that is input through the discharge control terminal DCG of the BMS 210 during the discharging operation of the battery pack 10, and then output a first level signal or a second level signal.

For example, the first vibrator circuit 231A is a circuit that outputs the first level signal if the first operating signal having the varying level is input, and outputs the second level signal if the second operating signal having the constant level is input. In this regard, the first vibrator circuit 231A may be a single-shot multi-vibrator.

The third transistor T3 is connected between a ground and a control electrode of the first transistor T1. A first resistor R1 is connected between the first electrode of the third transistor T3 and the control electrode of the first transistor T1. The second electrode of the third transistor T3 is connected to the ground, and the control electrode is connected to an output port of the first vibrator 231A. A second resistor R2 is connected between the control electrode of the first transistor T1 and the first electrode of the first transistor T1.

The third transistor T3 can be turned on in response to the first level signal that is input into the control electrode of the third transistor T3, and can be turned off in response to the second level signal.

When the third transistor T3 is turned on, a first node N1 is connected to the first resistor R1 and the ground, so that the voltage of the first node N1 is discharged to the ground, and thereby the first transistor T1 is turned on.

When the third transistor T3 is turned off, the first node N1 is not connected to the ground any more, thus preventing the voltage of the first node N1 from being discharged to the ground. Hence, the voltage of the first node N1 is increased to the voltage of the battery 100, so that the first transistor T1 is turned off.

The first blocking unit 240A can turn off the discharge control switch 220A in response to the blocking signal that is input through the discharge control terminal (DCG) of the BMS 210. The first blocking unit 240A may include a fifth transistor T5 and a sixth transistor T6.

The fifth transistor T5 is connected between the control electrode of the first transistor T1 and the first electrode of the first transistor T1. The first electrode of the fifth transistor T5 is connected to the first electrode of the first transistor T1, the second electrode is connected to the control electrode of the first transistor T1, and the control electrode is connected to a second node N2. A fifth resistor R5 is connected between the first electrode of the fifth transistor T5 and the second node N2.

The sixth transistor T6 is connected between the fifth transistor T5 and the ground. A sixth resistor R6 is connected between the first electrode of the sixth transistor T6 and the second node N2. The ground is connected to the second electrode of the sixth transistor T6, and the discharge control terminal DCG is connected to the control electrode.

The sixth transistor T6 can be turned on in response to the blocking signal that is input into the control electrode of the sixth transistor T6. The sixth transistor T6 can be turned off when no blocking signal is input.

Since the second node N2 is connected to the sixth resistor R6 and the ground when the sixth transistor T6 is turned on, the voltage of the second node N2 is discharged to the ground, and thereby the fifth transistor T5 is turned on.

When the fifth transistor T5 is turned on, the voltage of the first node N1 is increased to the voltage of the battery 100, so that the first transistor T1 is turned off.

Since the second node N2 is not connected to the ground any more when the sixth transistor T6 is turned off, the voltage of the second node N2 is not discharged to the ground. Therefore, the voltage of the second node N2 is increased to the voltage of the battery 100, and thereby the fifth transistor T5 is turned off.

The second monitoring unit 230B includes a second vibrator circuit 231B and a fourth transistor T4.

The second vibrator circuit 231B receives the operating signal that is input through the charge control terminal CHG of the BMS 210 during the discharging operation of the battery pack 10, thus outputting the first level signal or the second level signal.

For example, the second vibrator circuit 231B outputs the first level signal if the first operating signal having the varying level is input, and outputs the second level signal if the second operating signal having the constant level is input. The second vibrator circuit 231B may be a single-shot multi-vibrator.

The fourth transistor T4 is connected between the ground and the control electrode of the second transistor T2. A third resistor R3 is connected between the first electrode of the fourth transistor T4 and the control electrode of the second transistor T2. The second electrode of the fourth transistor T4 is connected to the ground, and the control electrode is connected to an output port of the second vibrator 231B. A fourth resistor R4 is connected between the control electrode of the second transistor T2 and the first electrode of the second transistor T2.

The fourth transistor T4 can be turned on in response to the first level signal that is input into the control electrode of the fourth transistor T4, and is turned off in response to the second level signal.

When the fourth transistor T4 is turned on, a third node N3 is connected to the third resistor R3 and the ground, so that the voltage of the third node N3 is discharged to the ground, and thereby the second transistor T2 is turned on.

When the fourth transistor T4 is turned off, the third node N3 is not connected to the ground any more, thus preventing the voltage of the third node N3 from being discharged to the ground. Hence, the voltage of the third node N3 is increased to the voltage of the positive terminal 251 of the battery pack 20, so that the second transistor T2 is turned off.

The second blocking unit 240B can turns off the charge control switch 220B based on the blocking signal that is input through the charge control terminal (CHG) of the BMS 210. The second blocking unit 240B may include a seventh transistor T7 and an eighth transistor T8.

The seventh transistor T7 is connected between the control electrode of the second transistor T2 and the first electrode of the second transistor T2. The first electrode of the seventh transistor T7 is connected to the first electrode of the second transistor T2, the second electrode is connected to the control electrode of the second transistor T2, and the control electrode is connected to a fourth node N4. A seventh resistor R7 is connected between the first electrode of the seventh transistor T7 and the fourth node N4.

The eighth transistor T8 is connected between the seventh transistor T7 and the ground. An eighth resistor R8 is connected between the first electrode of the eighth transistor T8 and the fourth node N4. The ground is connected to the second electrode of the eighth transistor T8, and the charge control terminal CHG is connected to the control electrode.

The eighth transistor T8 can be turned on in response to the blocking signal that is input into the control electrode of the eighth transistor T8. The eighth transistor T8 can be turned off when no blocking signal is input.

Since the fourth node N4 is connected to the eighth resistor R8 and the ground when the eighth transistor T8 is turned on, the voltage of the fourth node N4 is discharged to the ground, and thereby the seventh transistor T7 is turned on.

When the seventh transistor T7 is turned on, the voltage of the third node N3 is increased to the voltage of the positive terminal 251 of the battery pack 20, so that the second transistor T2 is turned off.

Since the fourth node N4 is not connected to the ground any more when the eighth transistor T8 is turned off, the voltage of the fourth node N4 is not discharged to the ground. Therefore, the voltage of the fourth node N4 is increased to the voltage of the positive terminal 251 of the battery pack 20, so that the seventh transistor T7 is turned off.

As shown in FIG. 4, the positive terminal B+ of the battery 100 is connected to the first electrode of the first transistor T1, and the positive terminal 251 of the battery pack 10 is connected to the first electrode of the second transistor T2. However, naturally, the positive terminal 251 of the battery pack 10 may be connected to the first electrode of the first transistor T1, and the positive terminal B+ of the battery 100 may be connected to the first electrode of the second transistor T2.

Further, although it is shown that each of the first and second transistors T1 and T2 is formed using a n-type field-effect transistor (FET), the first, second transistor T1, T2 may be formed using a p-type field-effect transistor (FET) without being limited to the n-type field-effect transistor. Furthermore, although it is shown that each of the third, fourth, sixth and eighth transistors T3, T4, T6 and T8 is an N-type junction transistor (BJT) and each of the fifth and seventh transistors T5 and T7 is a P-type junction transistor (BJT), they may be formed using the field effect transistor (FET).

In this regard, the first electrode of each of the third to eighth transistors T3 to T8 may be an emitter electrode or a collector electrode, while the second electrode may be an electrode that is different from the first electrode. For example, if the first electrode is the emitter electrode, the second electrode may be the collector electrode.

Figure 5:
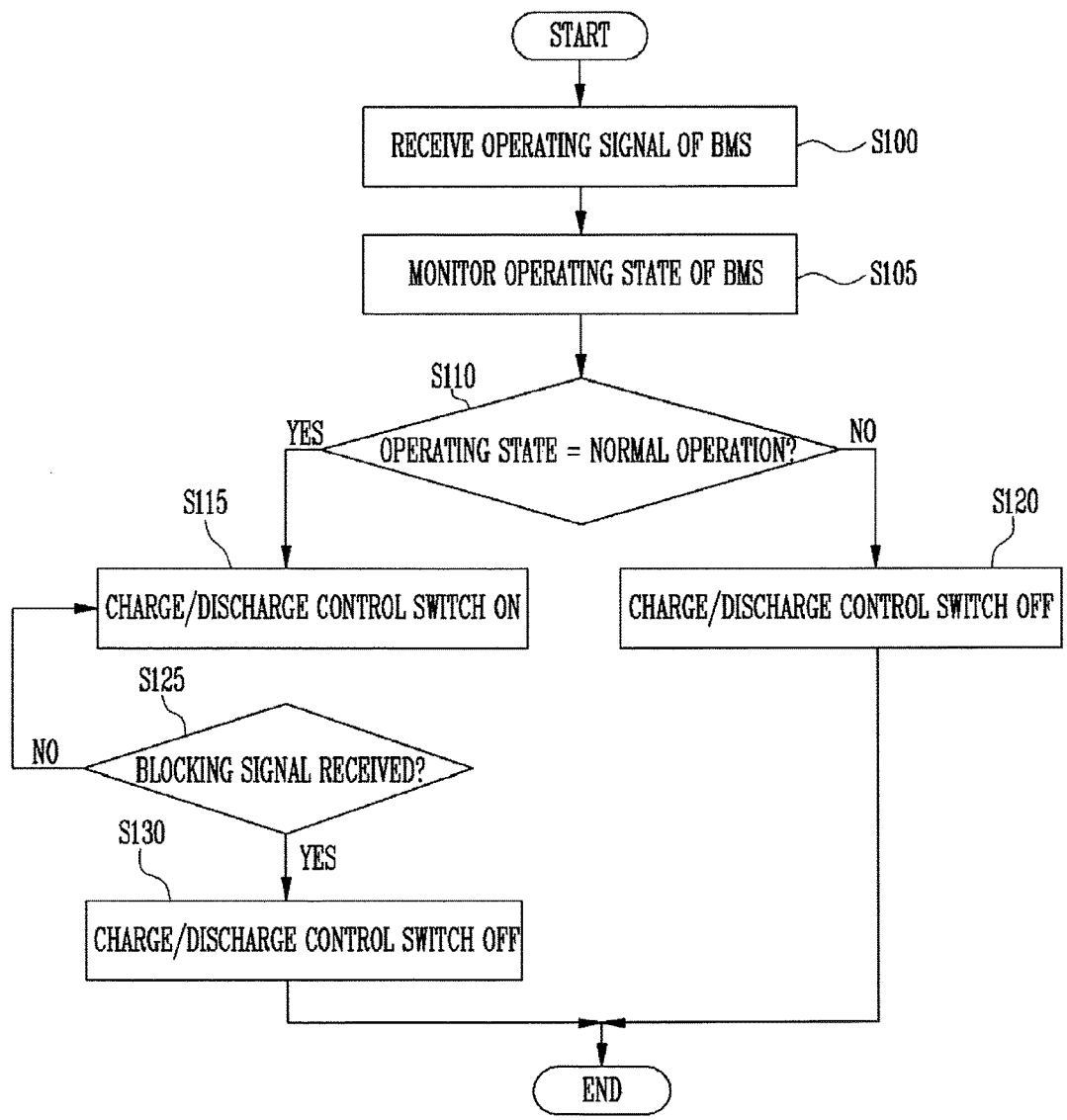
FIG. 5 is a flowchart showing the entire flow of a method of controlling a battery pack according to an embodiment.

FIG. 5 is a flowchart showing the entire flow of a method of controlling a battery pack according to an embodiment. Hereinafter, the method of controlling the battery pack according to the embodiment will be described with reference to FIGS. 3 and 5.

First, at step S100, the monitoring unit 230 receives the operating signal from the BMS 210

Here, the operating signal may include the first operating signal whose level varies, and the second operating signal whose level is kept constant.

Subsequently, at step S105, the monitoring unit 230 monitors the operating state of the BMS 210 using the operating signal. For example, if the operating signal is the first operating signal, the monitoring unit 230 determines that the BMS 210 is operating normally. Also, if the operating signal is the second operating signal, the monitoring unit 230 determines that the BMS 210 is operating abnormally.

Next, if it is determined that the BMS 210 is operating normally according to the result monitored at step S110, the monitoring unit 230 can control the charge/discharge control switch 220 to be turned on, at step S115. In contrast, if it is determined that the BMS 210 is operating abnormally according to the result monitored at step S110, the monitoring unit 230 can control the charge/discharge control switch 220 to be turned off, at step S120.

At step S125, the blocking unit 240 determines whether the blocking signal is received from the BMS 210 while the charge/discharge control switch 220 is controlled to be on.

At step S130, the blocking unit 240 turns off the charge/discharge control switch 220 if the blocking unit 240 receives the blocking signal.

As described above, according to at least one of the disclosed embodiments, the operating state (normal or abnormal operating state) of the BMS 210 is monitored, and then the charge/discharge control switch 220 is controlled to be turned off when the BMS 210 is operating abnormally, thus protecting the battery 100.

At least one embodiment can include an additional blocking unit 240 to allow the charge/discharge control switch 220 to be immediately turned off, thus preventing the delay operation of the charge/discharge control switch that is controlled to be on or off according to the monitored result.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack including at least one battery cell, the battery pack comprising:
 a charge/discharge control switch connected between the battery cell and a terminal of the battery pack and configured to control charge and discharge current of the battery cell;
 a battery management system configured to generate an operating signal to control the charge/discharge control switch, wherein the operating signal comprises a first operating signal having a varying level or a second operating signal having a constant level;
 a monitoring unit configured to receive the operating signal from the battery management system and determine whether the operating signal has a varying level or a constant level, the monitoring unit being further configured to control an on/off state of the charge/ discharge control switch based at least in part on whether the operating signal has the varying level or the constant level; and a blocking unit configured to turn off the charge/discharge control switch based at least in part on a blocking signal received from the battery management system.

2. The battery pack of claim 1, wherein the monitoring unit is further configured to control the charge/discharge control switch to remain turned on based at least in part on the first operating signal, and turn off the charge/discharge control switch based at least in part on the second operating signal.

3. The battery pack of claim 2, wherein the blocking unit is further configured to turn off the charge/discharge control switch based at least in part on the blocking signal received while the charge/discharge control switch is turned on.

4. The battery pack of claim 2, wherein the monitoring unit further comprises a vibrator circuit configured to output a first level signal based at least in part on the first operating signal, and output a second level signal based at least in part on the second operating signal.

5. The battery pack of claim 4, wherein the charge/discharge control switch comprises:
a discharge control switch including a first parasitic diode and a first transistor; and
a charge control switch including a second parasitic diode and a second transistor.

6. The battery pack of claim 5, wherein the monitoring unit comprises:
a first monitoring unit including a first vibrator circuit and configured to control an on/off state of the discharge control switch; and
a second monitoring unit including a second vibrator circuit and configured to control an on/off state of the charge control switch.

7. The battery pack of claim 6, wherein the first monitoring unit further comprises:
a third transistor connected between a control electrode of the first transistor and a ground;
a first resistor connected between a control electrode of the first transistor and the third transistor; and
a second resistor connected between the control electrode of the first transistor and a first electrode of the first transistor.

8. The battery pack of claim 7, wherein the third transistor is configured to be turned on when the first level signal is provided from the first vibrator circuit into the control electrode of the third transistor.

9. The battery pack of claim 6, wherein the second monitoring unit further comprises:
a fourth transistor connected between a control electrode of the second transistor and the ground;
a third resistor connected between the control electrode of the second transistor and the fourth transistor; and
a fourth resistor connected between the control electrode of the second transistor and a first electrode of the second transistor.

10. The battery pack of claim 9, wherein the fourth transistor is configured to be turned on when the first level signal is provided from the second vibrator circuit into the control electrode of the fourth transistor.

11. The battery pack of claim 5, wherein the blocking unit comprises:
a first blocking unit configured to turn off the discharge control switch; and
a second blocking unit configured to turn off the charge control switch.

12. The battery pack of claim 11, wherein the first blocking unit comprises:
a fifth transistor connected between the first and control electrodes of the first transistor;
a sixth transistor connected between a control electrode of the fifth transistor and the ground;
a fifth resistor connected between the control electrode of the fifth transistor and the first electrode of the first transistor; and
a sixth resistor connected between the control electrode of the fifth transistor and the sixth transistor.

13. The battery pack of claim 12, wherein each of the fifth and sixth transistors is configured to be turned on when the blocking signal is input into the control electrode of the sixth transistor.

14. The battery pack of claim 11, wherein the second blocking unit comprises:
a seventh transistor connected between the first and control electrodes of the second transistor;
an eighth transistor connected between a control electrode of the seventh transistor and the ground;
a seventh resistor connected between the control electrode of the seventh transistor and the first electrode of the second transistor; and
an eighth resistor connected between the control electrode of the seventh transistor and the eighth transistor.

15. The battery pack of claim 14, wherein each of the seventh and eighth transistors is configured to be turned on when the blocking signal is input into the control electrode of the eighth transistor.

16. The battery pack of claim 5, wherein a terminal of the battery pack is configured to be connected to the first electrode of the second transistor when a terminal of the battery cell is connected to the first electrode of the first transistor, and
wherein the terminal of the battery cell is configured to be connected to the first electrode of the second transistor when the terminal of the battery pack is connected to the first electrode of the first transistor.

17. A method of controlling a battery pack including at least one battery cell, and a battery management system configured to control a charge/discharge control switch connected between the battery cell and a terminal of the battery pack, the method comprising:
receiving an operating signal from the battery management system and determining whether the operating signal has a varying level or a constant level;
monitoring an operating state of the battery management system based at least in part on whether the operating signal has the varying level or the constant level;
controlling an on/off state of the charge/discharge control switch based at least in part on a monitored result; and
turning off the charge/discharge control switch when a blocking signal is received from the battery management system while the charge/discharge control switch is turned on,
wherein the operating signal comprises a first operating signal having a varying level or a second operating signal having a constant level.

18. The method of claim 17, wherein the monitoring further comprises:
determining that the battery management system is operating normally when the battery management system outputs the first operating signal; and determining that the battery management system is operating abnormally when the battery management system outputs the second operating signal.

19. The method of claim 18, wherein the controlling further comprises:

determining that the battery management system is operating normally when the charge/discharge control switch is turned on; and determining that the battery management system is operating abnormally when the charge/discharge control switch is turned off.

20. A battery pack including at least one battery cell, the battery pack comprising:

a charge/discharge control switch connected between the battery cell and a terminal of the battery pack and configured to control charge and discharge current of the battery cell;

a battery management system configured to generate an operating signal to control the charge/discharge control switch, wherein the operating signal comprises a first operating signal having a varying level or a second operating signal having a constant level; and a monitoring unit configured to determine, based at least in part on the first operating signal, that the battery management system is operating normally and to control the charge/discharge control switch to remain turned on, and wherein the monitoring unit is further configured to determine, based at least in part on the second operating signal, that the battery management system is operating abnormally and turn off the charge/discharge control switch.

21. The battery pack of claim 1, wherein the monitoring unit is further configured to determine that the battery management system is operating normally in response to the operating signal having the varying level, and determine that the battery management system is operating abnormally in response to the operating signal having the constant level.

* * * * *